United States Patent
Chimonides et al.

(10) Patent No.: US 6,196,085 B1
(45) Date of Patent: Mar. 6, 2001

(54) COUPLING AN ACCESSORY TO AN ENGINE CRANKSHAFT

(75) Inventors: Nikos Chimonides, Northants (GB); Damian P. Smith, Egnach (CH)

(73) Assignees: Cummins Engine Company Ltd, Darlington; Iveco (UK) Ltd., Watford; New Holland U.K. Ltd., Basildon, all of (GB)

( * ) Notice: Subject to any disclaimer, the term of this patent is extended or adjusted under 35 U.S.C. 154(b) by 0 days.

(21) Appl. No.: 09/358,228

(22) Filed: Jul. 21, 1999

(30) Foreign Application Priority Data

Jul. 21, 1998 (GB) .................................................. 9815750

(51) Int. Cl.[7] .............................. B23P 11/02; F02B 67/04
(52) U.S. Cl. ...................... 74/595; 29/888.08; 29/893.2; 403/359.6
(58) Field of Search .................... 74/595; 29/888.08, 29/893.33, 893.2; 123/198 C, 196 R; 403/359.1, 359.6; 184/31; 417/364; 72/370.2

(56) References Cited

U.S. PATENT DOCUMENTS

| | | | |
|---|---|---|---|
| 452,480 | 5/1891 | Lambert | 29/893.33 |
| 3,447,393 * | 6/1969 | Wiseman et al. | 403/359.1 X |
| 3,576,336 * | 4/1971 | Uhlig | 403/281 |
| 3,796,085 | 3/1974 | Fisher et al. | 72/348 |
| 4,131,032 | 12/1978 | Warland et al. | 74/449 |
| 4,295,807 * | 10/1981 | Kruger | 123/196 R |
| 4,397,171 * | 8/1983 | Suh et al. | 72/370.2 X |
| 4,624,227 * | 11/1986 | Wunsche | 123/198 C |
| 4,827,881 * | 5/1989 | Baker et al. | 123/198 C X |
| 4,876,876 | 10/1989 | Ishida et al. | 72/348 |
| 4,879,981 | 11/1989 | Matsumoto | 123/198 C |
| 5,085,187 * | 2/1992 | Black | 123/198 C X |
| 5,606,943 | 3/1997 | Tamba et al. | 123/90.23 |
| 5,829,911 * | 11/1998 | Yokota et al. | 403/359.6 |
| 6,045,292 * | 4/2000 | Placide et al. | 403/359.6 X |

FOREIGN PATENT DOCUMENTS

| | | |
|---|---|---|
| 1197399 | 7/1970 | (GB) . |
| 62-166029 | 7/1987 | (JP) . |
| 63-10025 | 1/1988 | (JP) . |
| 63-16818 | 1/1988 | (JP) . |
| 63-84734 | 4/1988 | (JP) . |

* cited by examiner

Primary Examiner—Charles A. Marmor
Assistant Examiner—Ankur Parekh
(74) Attorney, Agent, or Firm—Gary M. Gron

(57) ABSTRACT

A method and mechanism are disclosed for coupling an accessory to an engine crankshaft. To avoid the cost of machining splines on the crankshaft 10, the 14 end of the crankshaft 10 is formed as a cylindrical spigot. A separately formed splined pressed steel sleeve 16 is then mounted on the end 14 of the crankshaft 10 with interference fit.

11 Claims, 2 Drawing Sheets

COUPLING AN ACCESSORY TO AN ENGINE CRANKSHAFT

FIELD OF THE INVENTION

The present invention relates a method and mechanism for coupling an accessory, such as an oil pump, directly to an engine crankshaft.

BACKGROUND OF THE INVENTION

It is known in certain engines to mount an oil pump on the front end of an engine offset from the axis of the crankshaft and to drive the oil pump by means of a gear on the crankshaft meshing with a gear on the oil pump that is offset from the axis of the crankshaft, so that the oil pump is driven only indirectly by the engine crankshaft.

It is desirable to be able, in different variants of the same engine, to substitute for the gear driven oil pump a concentric oil pump that is driven directly from the crankshaft. This, however, presents problems because the pumping elements of the directly driven oil pump include a sintered iron rotor that must be fitted over the nose of the crankshaft and coupled for rotation with it. The coupling mechanism on the crankshaft must be sufficiently simple to be incorporated into the manufacturing process of the crankshaft without adding considerably to the manufacturing costs. This consideration precludes the machining of splines or gear teeth on the outer surface of the crankshaft. Furthermore, the coupling mechanism must have a geometric shape that will drive the sintered iron rotor without causing damage or wear and this precludes the use of a Woodruff key. A further consideration is that it is necessary to ensure that the crankshaft should remain usable with a gear driven oil pump.

OBJECT OF THE INVENTION

The invention therefore seeks to provide a means of coupling an accessory directly to an engine crankshaft that mitigates, if not eliminates, at least some of the foregoing problems.

SUMMARY OF THE INVENTION

According to a first aspect of the present invention, there is provided a method of coupling an accessory to an engine crankshaft which comprises forming the end of the crankshaft as a cylindrical nose, forming a splined sleeve and pressing the splined sleeve on the end of the crankshaft with an interference fit.

According to a second aspect of the invention, there is provided an engine having a crankshaft of which one end is formed as a cylindrical nose and a sleeve pressed over the end of the crankshaft with an interference fit, the sleeve being formed with splines for driving an accessory mounted directly on the crankshaft.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
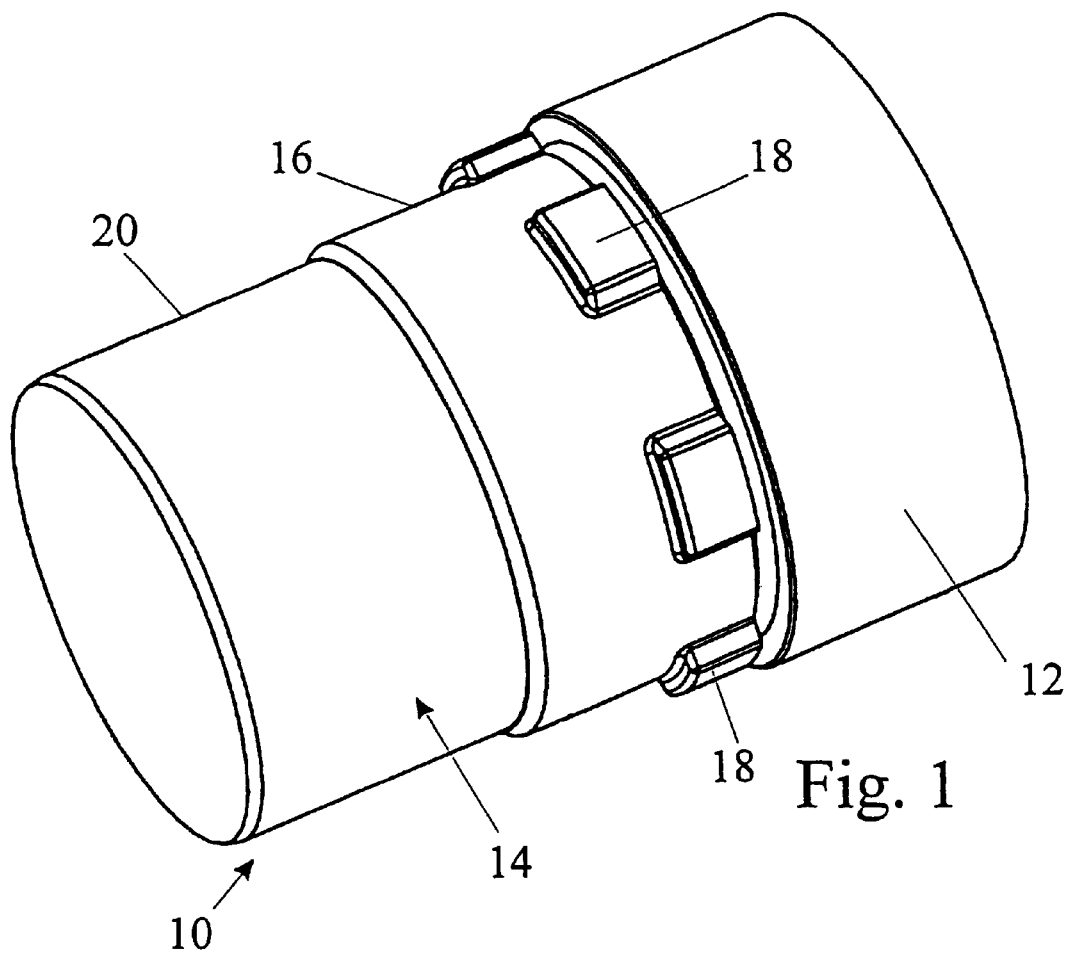
FIG. 1 is a perspective view of one end of a crankshaft fitted with a splined pressed steel sleeve for driving an accessory, such as an oil pump.

FIG. 1 schematically shows a crankshaft 10 having a main bearing journal 12 and a crank nose 14. The crank nose 14 is cylindrical and is machined in the conventional manner so that no additional costs are incurred in its production.

Figure 2:
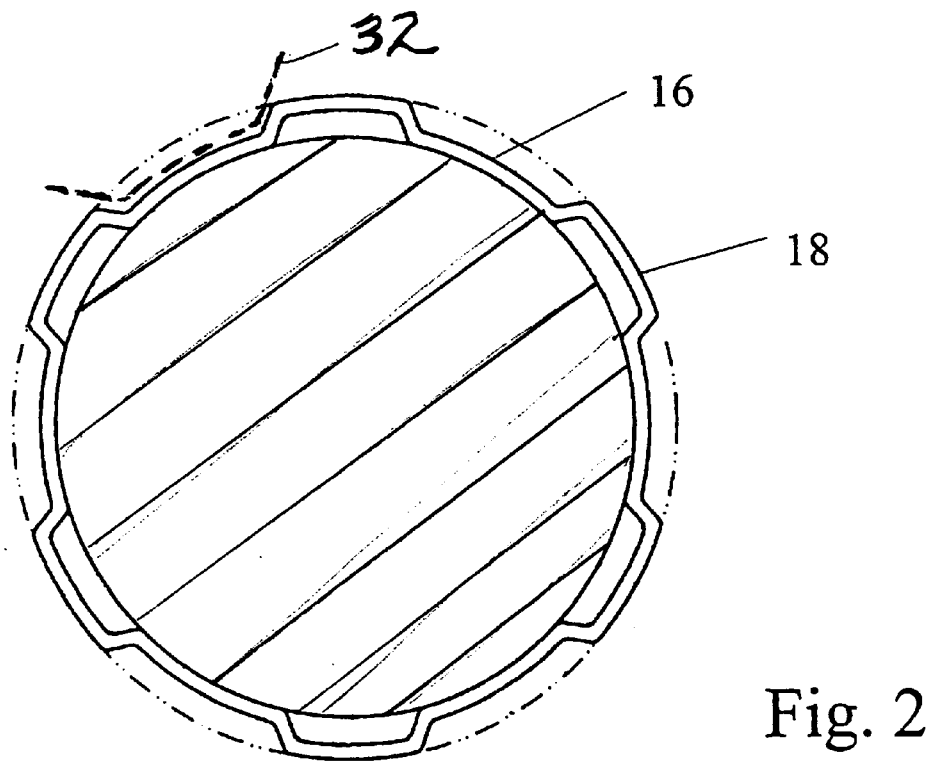
FIG. 2 is a section through the crankshaft and the pressed sleeve in a plane containing the splines.
Figure 3:
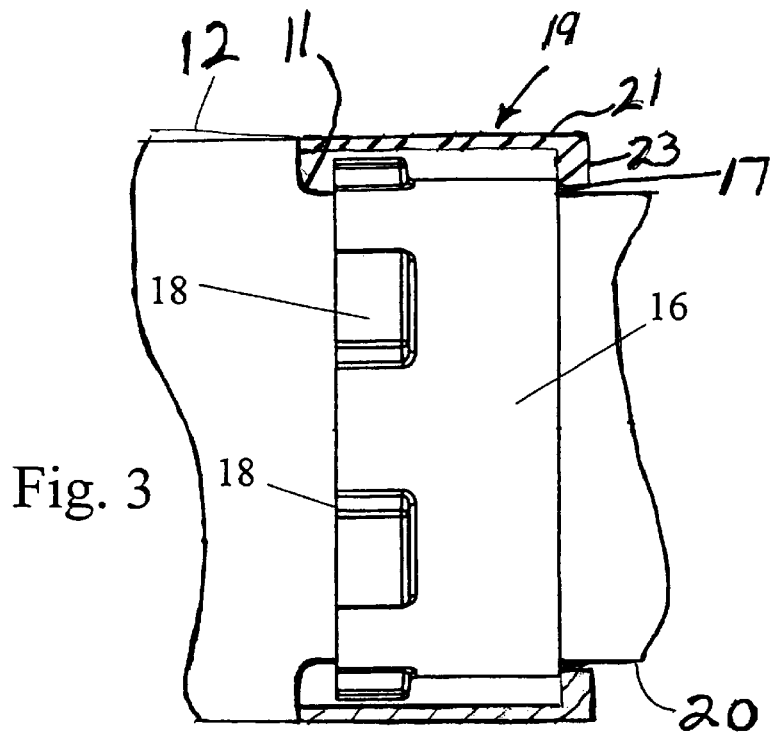
FIG. 3 is a side view of the splined sleeve in position on the crankshaft and an installation tool.

To enable an accessory to be driven directly from the crankshaft, a separately formed sleeve 16 having splines 18 is pressed over the end of the crankshaft 10. The sleeve 16, which is shown also in FIGS. 2 and 3, is formed of mild steel that is pressed from an annular flat disc into a cylindrical form and the splines 18 are subsequently punched into the sleeve 16. The inside diameter of the sleeve must be precisely controlled to achieve the desired interference with the crankshaft 10 and this is achieved using an appropriate sizing tool(not shown), thereby obviating the need for any machining of the sleeve 16. The minimum interference fit must still be sufficient to allow the sleeve to drive the pump rotor, while the maximum fit must not be so great that it causes the sleeve 16 to yield.

The sleeve 16 is pressed on at a predetermined distance from the main bearing journal 12 to avoid fouling with the fillet at the shoulder with the main bearing journal 12. This is conveniently achieved by means of a stop on the assembly press tool 19, shown in FIG. 3. Tool 19 comprises an outer sleeve 21 of sufficient diameter to extend over the periphery of splined sleeve 16 and abut the sidewall of the crankshaft main bearing journal 12. An integral radial flange 23 extends inward to abut an end 17 of sleeve 16. When the tool 19 is used to press on sleeve 16, the sleeve 16 is positioned by flange 23 at a sufficient distance from the sidewall of crankshaft main bearing journal 12 to avoid the crankshaft filet 11.

Figure 4:
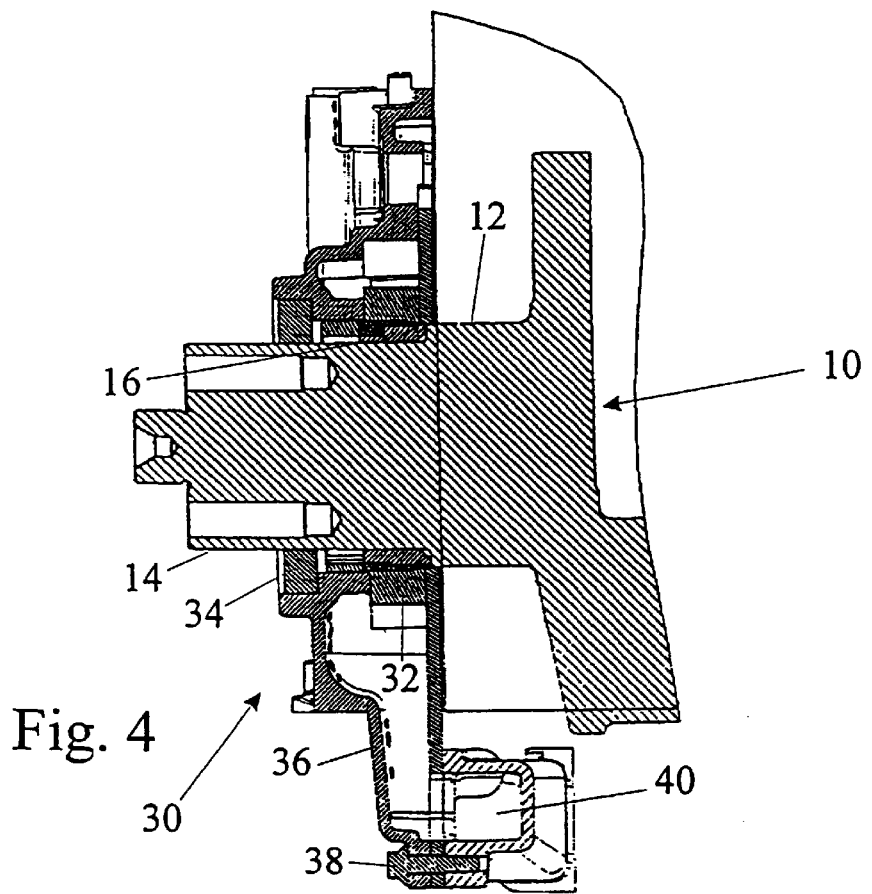
FIG. 4 is a section through a concentric oil pump fitted to the front end of a crankshaft of an engine.

FIG. 4 is a section showing a concentric oil pump 30 fitted to the crankshaft 10. The pump 30 has a housing 36 that is secured to the engine block by means of bolts 38 and defines a working chamber within which there rotates a sintered iron rotor 32 that is coupled directly to the crankshaft through the splined sleeve 16. The pump draws oil from a channel 40 that communicates with the bottom of the oil sump and has an outlet (not shown in the section of the drawing) connected to an oil gallery of the engine.

The portion 20 of the crank nose 14 lying forward of the sleeve 16 serves in use for location of a seal 34 of the oil pump 30 and it is therefore important that this portion 20 should not be scored during the pressing of the sleeve 16 on to the end of the crankshaft. For this reason, this portion 20 is dimensioned with a slightly smaller outside diameter such that the sleeve 16 can slide over it during assembly without causing it any damage.

After the pump 30 has been assembled over the crankshaft, a pulley and damper for driving accessory drives, such as a cooling fan, is attached to the crankshaft nose in the usual manner.

In use, oil is injected at high pressure between the main crankshaft shells and the corresponding bearing surfaces on the crankshaft, in order to avoid getting rapid wear on the bearings. For this reason, the crankshaft 10 is required to float very slightly (a few thousandths of a millimeter) and account should be taken of this movement when driving the oil pump 30. In the known drive arrangements, where the pump is located offset from the crankshaft, the gear on the crankshaft and the meshing gear on the pump are made such that some movement in between the gears is allowed. However, in the situation where the pump is mounted concentrically on the crankshaft, conventionally shaped external splines on the crankshaft nose and cooperating internal splines in the pump would prevent the crankshaft from floating on its high pressure bearing. As shown in FIG. 2, specially shaped splines with side wall angles greater than normal for a driving spline are therefore needed to transfer power only through their side surfaces, while allowing restricted radial movements of the crankshaft. It would be possible to make such splines directly on the crankshaft, but this would require a very expensive machining operation. In the invention, however, it is possible to make the splined sleeve 16 with the large splines which are operable to transfer power through their side surfaces without using their top surfaces.

A splined drive is acceptable with regards to wear of the driven accessory but the invention avoids the cost of machining splines directly onto the crankshaft by forming the splines on a separate sleeve. As the sleeve is thin, the splines can be formed simply using a punch, thus avoiding the need for costly machining.

Having thus described the invention, what is claimed as novel and desired to secured by letters patent of the united states is:

1. A method of coupling an accessory to an engine crankshaft which comprises the steps of forming the end of the crankshaft as a cylindrical nose, forming a splined sleeve and pressing the splined sleeve on the end of the crankshaft with an interference fit.

2. A method as claimed in claim 1 wherein the interference fit is within a range that is sufficient to allow a drive through the splines and not so great as to cause the material in the sleeve to yield.

3. A method as claimed in claim 2 wherein said crankshaft has a main bearing journal adjacent to said nose, there being formed a fillet between the nose and the side wall of the main bearing journal and wherein said sleeve is pressed over the nose to a predetermined distance from said main bearing journal to avoid the fillet.

4. An engine crankshaft of which one end is formed as a cylindrical nose and a sleeve fitted over the end of the crankshaft with an interference fit, the sleeve being formed with splines for driving an accessory mounted directly on the crankshaft.

5. An engine crankshaft as claimed in claim 4, wherein the splined sleeve is formed of mild steel.

6. An engine crankshaft as claimed in claim 5, wherein the splines are formed by deformation of the material of the sleeve.

7. An engine crankshaft as claimed in claim 6, wherein the crankshaft has a main bearing journal connected to the nose via a fillet section and wherein the splined sleeve is mounted adjacent the main bearing journal and with the sleeve lying at a predetermined distance from the shoulder of the main bearing journal to avoid interference with the fillet section.

8. An engine crankshaft as claimed in claim 4, wherein the interference fit is within a range that is sufficient to allow a drive through the splines and not so great as to cause the material in the sleeve to yield.

9. An engine crankshaft as claimed in claim 4, wherein the sidewalls of said splines are at an angle greater than normal for a driving spline.

10. An engine crankshaft as claimed in claim 4, wherein the nose of said crankshaft between said sleeve and the end of said crankshaft has a reduced diameter to prevent scoring when said sleeve is pressed on said crankshaft.

11. An engine crankshaft as claimed in claim 6 wherein the splines are formed over a portion of the sleeve that is less than the axial length thereof.

* * * * *